United States Patent
Russell Jackson et al.

(10) Patent No.: US 10,942,094 B2
(45) Date of Patent: Mar. 9, 2021

(54) SAMPLING SYSTEM FOR GRANULAR MATERIALS WITH SAMPLE EXTRACTOR AND SAMPLE DIVIDER

(71) Applicant: Intelliconn Communication Solutions Inc., Saskatoon (CA)

(72) Inventors: Kenneth Ernest Russell Jackson, Saskatoon (CA); Dean Friesen, Saskatoon (CA); Steven Peter Chivilo, Martensville (CA); Christopher David Hammel, Saskatoon (CA)

(73) Assignee: Intelliconn Communication Solutions Inc., Saskatoon (CA)

( * ) Notice: Subject to any disclaimer, the term of this patent is extended or adjusted under 35 U.S.C. 154(b) by 61 days.

(21) Appl. No.: 15/778,556

(22) PCT Filed: Nov. 23, 2016

(86) PCT No.: PCT/CA2016/051371
§ 371 (c)(1),
(2) Date: May 23, 2018

(87) PCT Pub. No.: WO2017/088051
PCT Pub. Date: Jun. 1, 2017

(65) Prior Publication Data
US 2018/0356313 A1 Dec. 13, 2018

(30) Foreign Application Priority Data
Nov. 23, 2015 (CA) ..................... 2912761

(51) Int. Cl.
*G01N 1/18* (2006.01)
*G01M 1/20* (2006.01)
*G01N 1/20* (2006.01)

(52) U.S. Cl.
CPC .............. *G01N 1/18* (2013.01); *G01M 1/20* (2013.01); *G01N 1/2035* (2013.01); *G01N 2001/2021* (2013.01)

(58) Field of Classification Search
CPC ......... G01N 1/2035; G01N 2001/2007; G01N 2001/2008; G01N 2001/2021; G01N 1/18;
(Continued)

(56) References Cited

U.S. PATENT DOCUMENTS

| | | | | | |
|---|---|---|---|---|---|
| 1,241,196 | A | * | 9/1917 | Cogswell | G01N 1/20 141/130 |
| 2,627,751 | A | * | 2/1953 | Pazandak | G01N 1/20 73/863.45 |
| 2,782,926 | A | * | 2/1957 | Saxe | G01N 15/0272 209/237 |

(Continued)

FOREIGN PATENT DOCUMENTS

| CA | 2714954 A1 | 10/2009 |
|---|---|---|
| CA | 2777106 A1 | 4/2011 |

(Continued)

OTHER PUBLICATIONS

International Search Report and Written Opinion for Application No. PCT/CA2016/051371, dated Feb. 20, 2017 (13 pgs.).

*Primary Examiner* — Justin N Olamit
(74) *Attorney, Agent, or Firm* — DeWitt LLP

(57) ABSTRACT

A material sampling system for obtaining a plurality of substantially similar samples of granular material, such as grain or other crop material, from a load of granular material is provided. The system can include a sample extractor for obtaining a sample portion of granular material, a sample divider operative to divide the sample portion of granular material into a plurality of smaller samples of granular material in a plurality of sample containers and a sample transfer conduit for transferring the sample of granular material from the sample extractor to the sample divider.

(Continued)

The sample portions can be taken at regular sample time intervals throughout the entire load of granular material to get an accurate representation of the granular material and information about the samples in the sample containers can be obtained by the system while it is obtaining the samples and this information stored for later use and display.

33 Claims, 10 Drawing Sheets

(58) Field of Classification Search
CPC ............. G01N 1/20; G01N 2001/2092; A01D 41/1277
See application file for complete search history.

(56) References Cited

U.S. PATENT DOCUMENTS

| | | | | |
|---|---|---|---|---|
| 4,170,900 | A * | 10/1979 | Ozawa | G01N 1/20 73/863.02 |
| 6,706,989 | B2 * | 3/2004 | Hunter | A01C 1/00 209/576 |
| 2014/0030800 | A1 * | 1/2014 | Moses | G01N 21/64 435/288.7 |
| 2018/0133719 | A1 * | 5/2018 | Oba | B02C 15/04 |

FOREIGN PATENT DOCUMENTS

| | | | |
|---|---|---|---|
| CA | 2928894 | A1 | 5/2015 |
| GB | 715831 | | 9/1954 |
| WO | WO 2008/150798 | A1 | 12/2008 |

* cited by examiner

SAMPLING SYSTEM FOR GRANULAR MATERIALS WITH SAMPLE EXTRACTOR AND SAMPLE DIVIDER

RELATED APPLICATION

The present application is a National Phase entry of PCT Application No. PCT/CA2016/051371, filed Nov. 23, 2016, which claims priority to Canadian Application No. 2,912,761, filed Nov. 23, 2015, said applications being hereby incorporated herein by reference in their entirety.

The present invention relates to a sampling system to obtain a sample of granular material like grain or some other crop material and more particularly to a sampling system that can obtain a number of individual samples of substantially similar granular material.

BACKGROUND

Accurate acquisition, splitting and tracking of grain samples is an industry wide problem in the agriculture sector that can result in the grain that is delivered being different than the sample the grain was purchased is based on. The problem can stem from innaccutate and/or inconsistent grain sampling coupled with innaccurate sample splitting.

SUMMARY OF THE INVENTION

In a first aspect, a material sampling system for obtaining a plurality of substantially similar samples of granular material from a load of granular material is provided. The system comprises a sample extractor for obtaining a sample portion of granular material, a sample divider operative to divide the sample portion of granular material into a plurality of smaller samples of granular material in a plurality of sample containers and a sample transfer conduit for transferring the sample of granular material from the sample extractor to the sample divider.

In a further aspect, the material sampling system has a sampling processor module operative to control the operation of the sample extractor and the sample divider. The sampling processor module having at least one processing unit and a computer readable memory containing program instructions.

In a further aspect, the programming instructions are operative to: receive input indicating a size of load; determine a flowrate of granular material through the sample extractor; determine a sample time interval; while flow is being sensed passing through the sample extractor, wait for the sample time interval to pass and then obtain a sample portion; and continue to take sample portions after each sample time interval has passed while flow of granular material passing through the sample extractor is being sensed until all of the sample portions have been taken.

In a further aspect, the program instructions are operative to: receive input indicating unique identifiers on each of the plurality of sample containers; receive input indicating information about the plurality of samples of granular material; obtain sample portions of granular material passing through the sample extractor for the load of granular material and collect information about the sample portions; using the information about the plurality of samples of granular material and information collected when the sample portions are obtained to create and populate a sample record; and associating the sample record with the unique identifiers.

In a further aspect, the program instructions are operative to: receive input indicating unique identifiers on each of the plurality of sample containers; receive input indicating information about the plurality of samples of granular material; obtain sample portions of granular material passing through the sample extractor for the load of granular material and collect information about the sample portions; using the information about the plurality of samples of granular material and information collected when the sample portions are obtained to create and populate a sample record; and associating the sample record with the unique identifiers.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
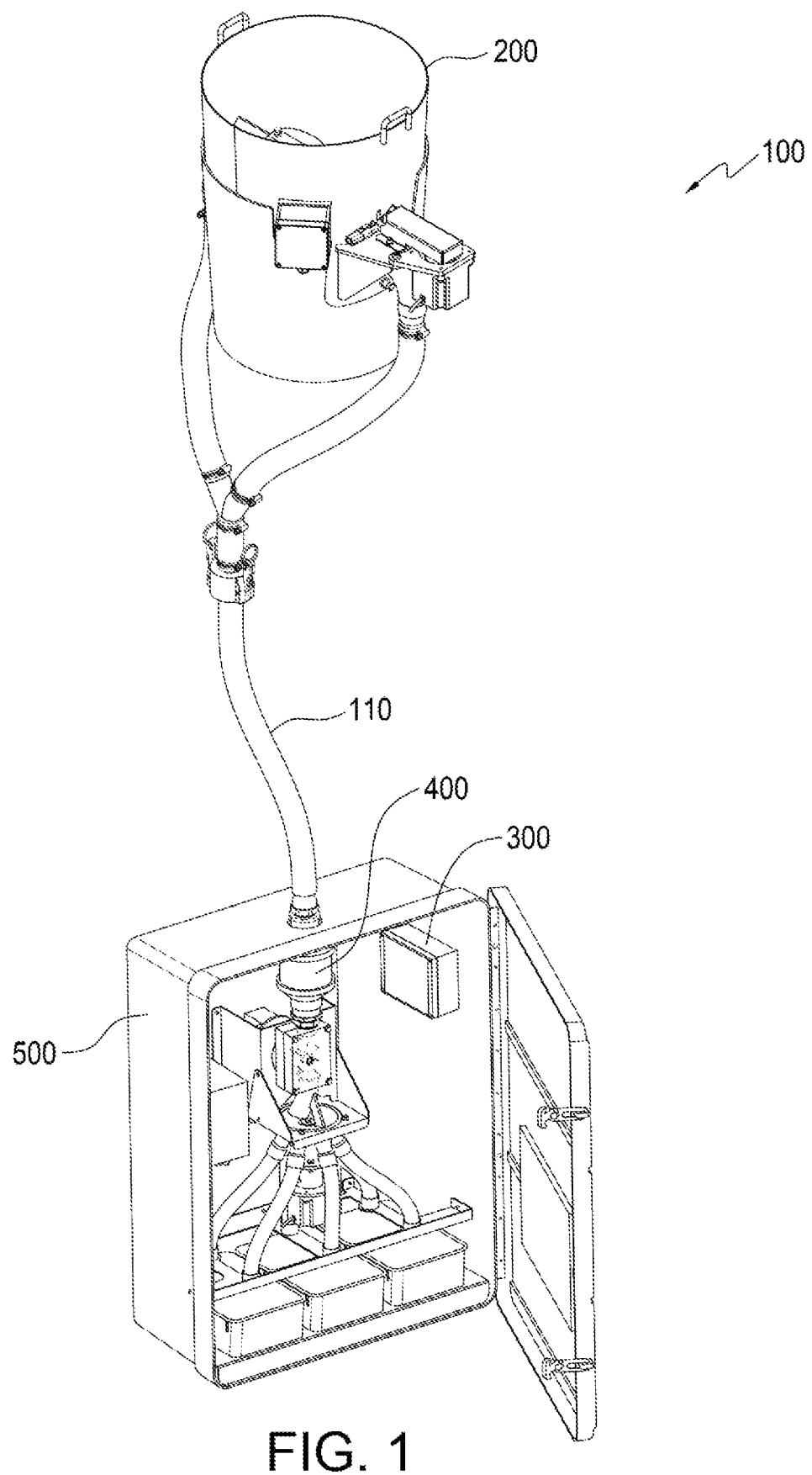
FIG. 1 is a schematic view of a sampling system for obtaining a plurality of substantially identical samples of granular material.

FIG. 1 illustrates a sampling system 100 for obtaining a plurality of substantially identical samples of granular material, such as grain. The sampling system 100 can include a sample extractor 200, a sample transfer conduit 110, a sampling processor module 300, an interface device 150, and a sample divider 400. The sample extractor 200 can be positioned anywhere granular material is being charged to collect a sample of the granular material. For example, the sample extractor 200 can be placed under the discharge end of a material conveyor, a grain conveyor, a swing auger, a leg type grain/material elevator, a combine harvester, a grain bagger, under a discharge of a bin, etc. to the granular material can be discharged through the sample extractor 200 where a small portion of this discharging granular material can be removed from the discharging flow of granular material. This small portion of granular material can be directed to the sample transfer conduit 110 to the sample divider 400 which will collect a number of substantially similar samples of the granular material.

The sampling processor module 300 can be used to control the operation of the sampling system 100 and the sampling processor module 300 can be accessed through the interface device 150.

In one aspect, the sample divider 400 and the sampling processor module 300 can be grouped together physically in a sample collection module 500 for ease of transport and use.

Figure 2:
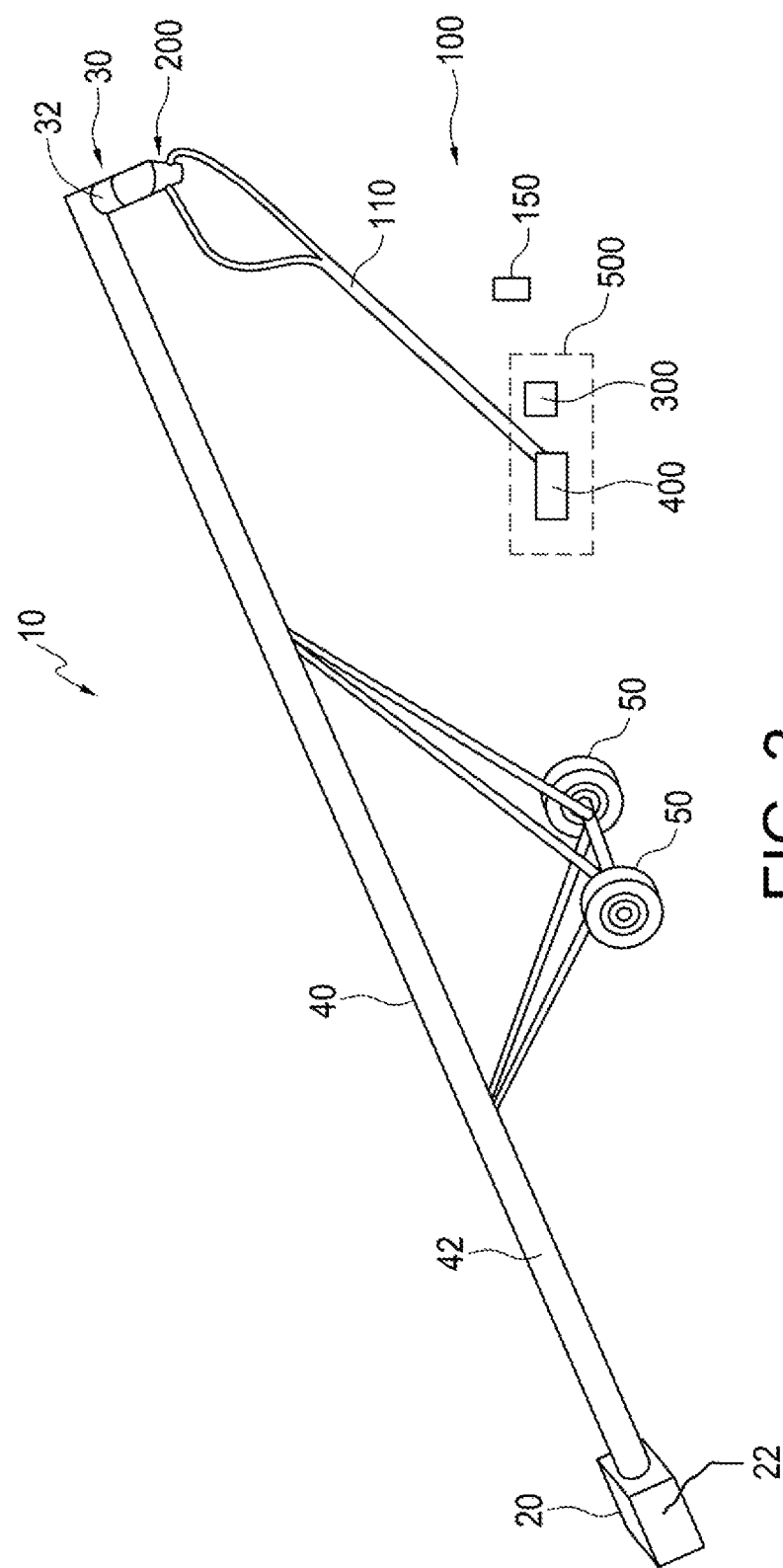
FIG. 2 is a perspective view of a material conveyor in the form of a conventional grain auger using a sampling system.

FIG. 2 illustrates a the sampling system 100 used in conjunction with a material conveyor 10 to obtain a number of substantially similar samples of granular material being transported by the material conveyor 10. The material conveyor 10 allows granular material such as grain or other crop material to be unloaded from one place, such as from a grain truck, storage bin, etc. and loaded into another location such as a storage bin, grain truck or trailer for transport, etc.

The material conveyor 10 can have an intake end 20 and a discharge end 30 with a conveying section 40 connecting the intake end 20 and the discharge end 30. Granular material, such as grain or other crop material, can be introduced into the intake end 20 of the material conveyor 10 where this granular material will then travel up the conveying section 40 and be discharged out the discharge end 30 of the material conveyor 10. The intake end 20 of the material conveyor 10 can include a hopper 22 where granular material can be introduced into the intake end 20 of the material conveyor 10. Typically, the hopper 22 is constructed such that it is low enough for collecting granular material from a grain truck, hopper trailer, etc.

Because the material conveyor 10 shown in FIG. 1 is an auger, the conveying section 40 will include a conveyor tube 42 and flighting (not shown) provided inside the conveyor tube 42. The flighting is rotated and as it rotates it lifts granular material from the intake end 20 up the conveying section 40 to the discharge end 30 of the material conveyor.

If the material conveyor 10 is a conveyor, the conveying section 40 can include a conveyor tube and a conveyor belt running through the conveyor tube to lift granular material up the material conveyor 10 to the discharge end 30 of the material conveyor 10.

The discharge end 30 of the material conveyor 10 can contain a discharge spout 32 to direct the discharging granular material that is exiting the discharge end 30 of the material conveyor 10 into a specific direction, such as into a grain bin, etc.

Typically, the material conveyor 30 will include a number of wheels 50 so that the material conveyor 10 can be moved from place to place.

The sample extractor 200 can be positioned below the discharge end 30 of the material conveyor 10 so that granular material discharged out the discharge end 30 of the material conveyor 10 passes through the sample extractor 200 where a small portion of this discharging granular material can be removed from the discharging flow of granular material as a sample portion. This sample portion of granular material can be directed to the sample transfer conduit 110 to the sample divider 400 which will collect a number of substantially similar sample portions of the granular material into a plurality of samples.

Figure 3:
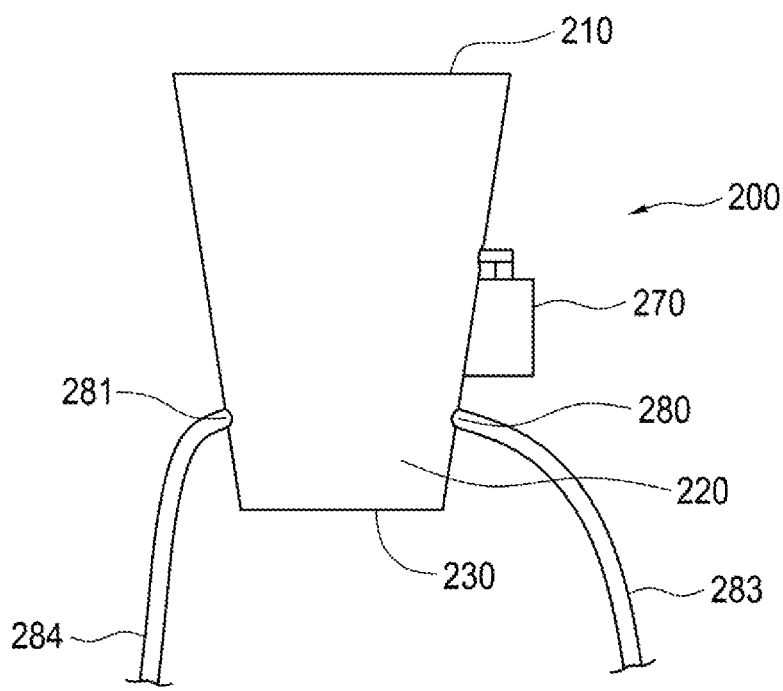
FIG. 3 is a side view of a sample extractor.
Figure 4:
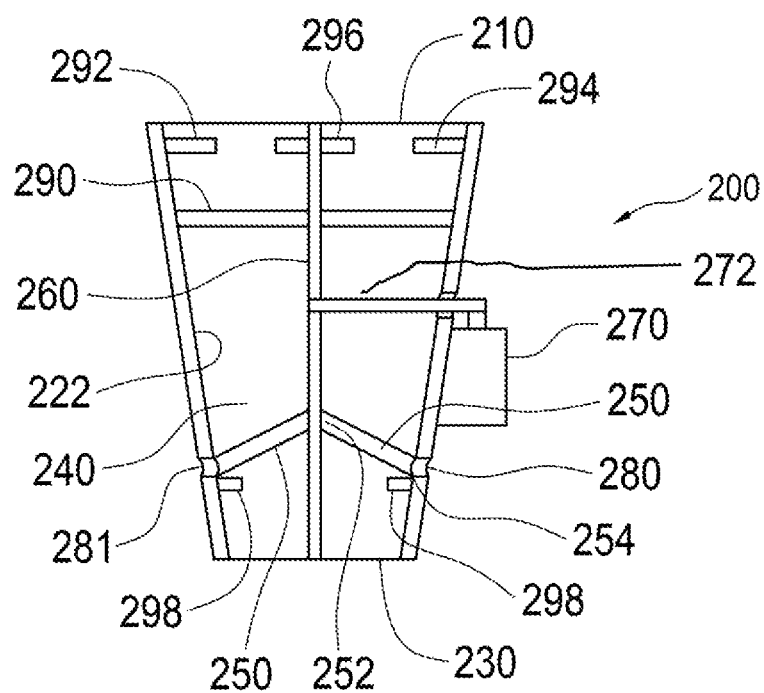
FIG. 4 is a schematic cutaway illustration of the sample extractor.

FIGS. 3 and 4 illustrates the sample extractor 200. The sample extractor 200 can be provided below the discharge spout 32 on the discharge end 30 of the material conveyor 10 so that granular material being discharged from the material conveyor 10 out of the discharge spout 32 will be discharged into the sample extractor 200 so that all of the granular material discharged out of the material conveyor 10 will pass through the sample extractor 200.

The sample extractor 200 can have an open top 210, a cylindrical body 220 and an open bottom 230 which together form a passage 240 through the sample extractor 200 that the granular material will pass through. One or more sampling members 250 can be connected to shaft 260 provided in the middle of the passage 240 formed in the cylindrical body 220. A first end 252 of the sampling member 250 can be connected to the shaft 260 so that the sampling member 250 extends outwards from the shaft 260 towards an inner wall 222 of the cylindrical body 220. The sampling member 250 can be a length that results in a second end 254 of the sampling member 250 being positioned proximate the inner wall 222 of the cylindrical body 220 with very little space between the second end 254 of the sampling member 250 and the inner wall 222 of the sample extractor 200. The sampling member 250 can rotate through a cross-section of the passage 240 so that it sweeps through the granular material passing through the passage 240, rotating through a plane perpendicular to the direction flow of the granular material.

The sampling member 250 can have a U-shaped cross section where this U-shaped cross section is open at the second end 254. The sampling member 250 can be positioned so that the U-shaped cross section forms a channel in the sampling member 250 with the open top of the channel facing the open top 210 of the sample extractor 200 so that some of the granular material entering the open top 210 of the sample extractor 200 and falling through the cylindrical body 220 will fall into the open channel in the sampling member 250 and be contained in the channel.

An electric motor 270 can be attached by a belt 272 to the shaft 260. The motor 270 can rotate the belt 272, which in turn will rotate the shaft 260. As the shaft 260 rotates, the sampling member 250 can rotate through the cross-section of the sample extractor 200 and therefore rotate through the flow of granular material passing through the cylindrical body 220 of the sample extractor 200 before it is discharged out the open bottom 230 of the sample extractor 200. Some of the granular material will collect in the channel formed by the sampling member 250 as the sampling member 250 rotates through the discharging granular material.

A first opening 280 and a second opening 281 can be provided in the cylindrical body 220 of the sample extractor 200 so that granular material that has fallen into the channel formed by the sample member 250 can be discharged out of the sample extractor 200 through this first opening 280 and second opening 281 rather than exiting through the open bottom 230 of the sample extractor 200 like the other granular material. The first opening 280 and the second opening 281 can be positioned so that they align with the second end 254 of the sampling member 250 as it rotates past the place in the inner wall 222 the first opening 280 and second opening 281 are provided. In one aspect, the first opening 280 and the second opening 281 can be positioned approximately 180° from one another in the inner wall 222 of the sample extractor 200 so that the first opening 280 and the second opening 281 are diametrically opposed in the inner wall 222 of the sampling extractor 200.

Although, the rotation of the sample member 250 can cause any granular material in the open channel formed by the sample member 250 to move from the first end 252 of the sample member 250 towards the second end 254 of the sample member 250 as a result of centripetal force, in one aspect, the sample member 250 can be sloped downwards so that the granular material will move towards the second end 254 of the sample member 250 by gravity without requiring as much or any centripetal force At the open second end 254 of the sample member 250 the granular material can slide off the sample member 250 towards the inner wall 222 of the sample extractor 250. With the sample member 250 positioned with the second end 254 of the sample member 250 in front of either the first opening 280 or the second opening 281, the granular material falling off the second end 254 of the sample member 250 can fall through either the first opening 280 of the second opening 281 (depending on which one the second end 254 of the sample member 250 is positioned in front of) in the inner wall 222 of the sample extractor 200.

In one aspect, a position sensor 298 can be used with the sample member 250. This position sensor can allow the sample extractor 200 to rotate the sample member 250 through one 180° rotation. This, in addition to a downwards slant of the sample member 250, can allow the sample extractor 200 to rotate the sample member 250 through 180° to take a sample, ending the rotation of the sample member 250 either at the first opening 280 or the second opening 281 in the sample extractor 200. For example, the sample member 250 can be rotated so that the second end 254 of the sample member 250 can be positioned adjacent the first opening 281 allowing the granular material that has collected in the sample member 250 to slide down the sample member 250 and out the first opening 280. The sample member 250 can then be rotated another 180° so that the second end 254 of the sample member 250 can be positioned in front of the second opening 281 and granular material that has fallen into the sample member 250 during its sweep to this position can slide down the sample member 250 and through the second opening 281.

In one aspect, the sample member 250 can be positioned under a deflector 290 when not in use and positioned with the second end 254 of the sample member 250 in front of either the first opening 280 or the second opening 281. The deflector 290 can cover the sample member 250 so that granular material falling through the sample extractor 200 will contact the deflector 290 and be prevented from filling the sample member 250 when a sample is not being taken by the sample extractor 200. In this manner, the sample member 250 is not exposed to the flow of granular material when a sample is not being taken, but rather, only when it is in its 180° rotation between the first opening 280 and the second opening 281.

Conduits 283, 284 can be connected to the first opening 280 and second opening 281, respectively. To route granular material that has exited the first opening 280 and the second opening 281 to the sample transfer conduit 110.

In one aspect, the power being supplied to the motor 270 in the sampling extractor 200 can be controlled by the sampling processor module 300 allowing the sampling processor module 300 to control the supply of power to the motor 270 and thereby control when the sample member 250 rotates through the discharging granular material in the sample extractor 200 to obtain the sample portion. This allows the operation of the motor 270 to be controlled by the sampling processor module 300 and therefore control when the sample extractor 200 will and will not extract samples of granular material to be directed to the first opening 280 and second opening 281 and into the sample transfer conduit 110.

The sample extractor 200 can also include a number of sensors to obtain information about the granular material flowing through the sample extractor 200. The sample extractor 200 can include a flow sensor 292 to detect the flow of granular material through the sample extractor 200. In one aspect, the flow sensor 292 can be a pressure sensor positioned on top of the deflector 290 that can sense the force of discharge granular material hitting the flow sensor 292 as the granular material passes through the sample extractor 200 indicating that there is flow of granular material through the sample extractor 200. A moisture sensor 294 may also be provided in the sample extractor 200 to determine the moisture content of the granular material passing through the sample extractor 200. The sample extractor 200 may also include a temperature sensor 296 for measuring the temperature of the granular material passing through the sample extractor 200.

Referring again to FIG. 1, the opening 280 in the inner wall 222 of the sample extractor 200 can be connected to the sample transfer conduit 110 by the conduits 283, 280 so that granular material flowing out of the sample extractor 200 through the openings 280, 281 will enter the sample transfer conduit 110.

The sample transfer conduit 110 can run between the sample extractor 200 and the sample divider 400 and convey any granular material sampled by the sample extractor 200 to the sample divider 400. The sample collection module 500 can be positioned relative to the sample extractor 200 so that the sample transfer conduit 110 has a steep enough angle that granular material will fall down the sample transfer conduit 110 by gravity and enter the sample divider 400. In one aspect, the sample transfer conduit 110 may be telescoping so that its length can be varied.

In one aspect, wiring can be run along the sample extractor 200 so that the wiring can be connected between the sample extractor 200 and the sampling processor module 300. This can allow the sampling processor module 300 to send power to the motor 270 of the sample extractor 200 and obtain signals from the various sensors in the sample extractor 200.

Figure 5:
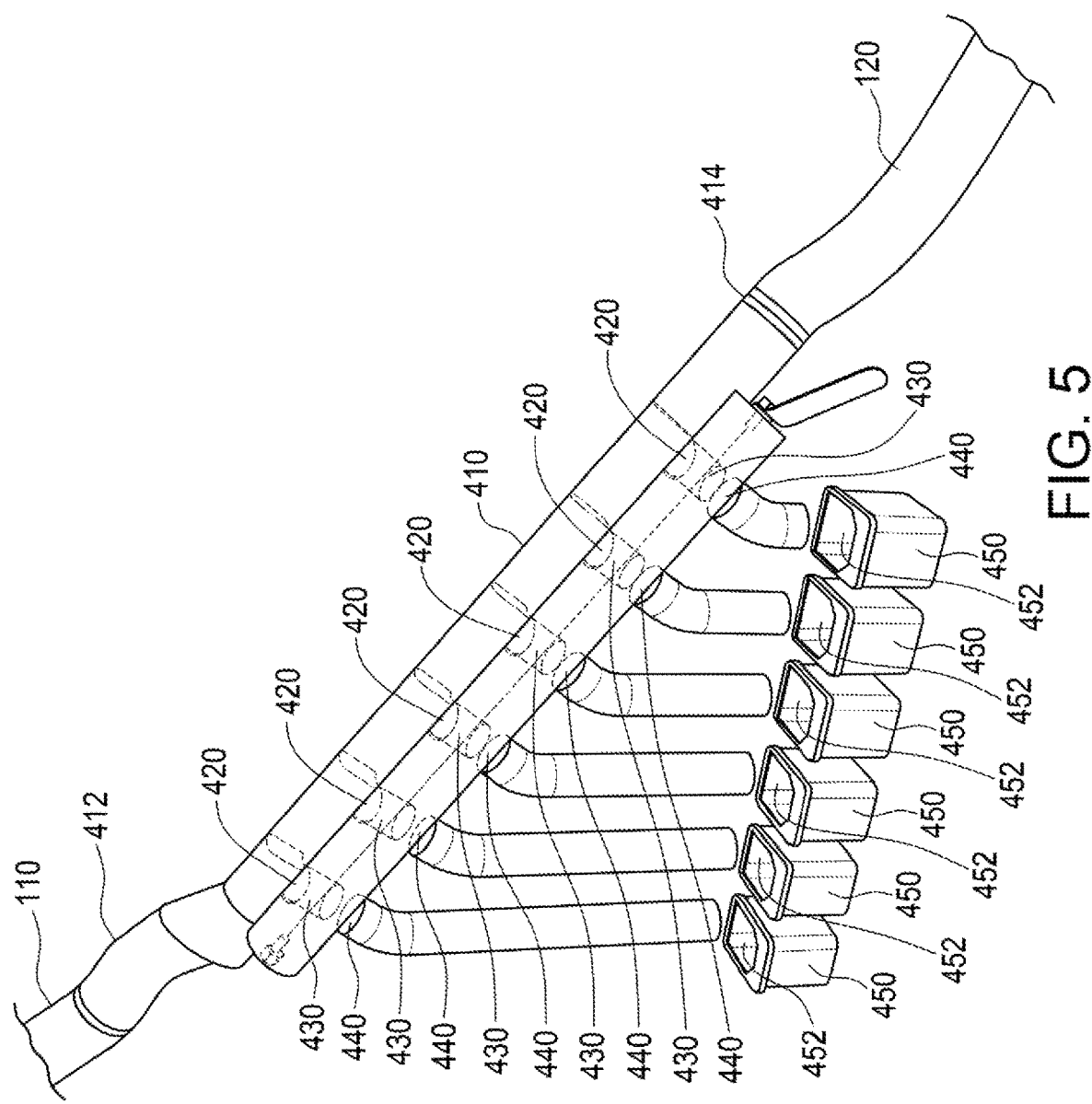
FIG. 5 is a schematic illustration of a sample divider.

Referring to FIG. 5, the sample divider 400 can have a sampling conduit 410 with an inlet 412 and an outlet 414. The sample transfer conduit 110 can be attached to the sample divider 400 at the inlet end 412 of the sampling conduit 410 or alternatively it can be a portable module that can be set up adjacent to the material conveyor 10 and connected to the other components in the sampling system 100.

A metering device, such as a metering wheel (either active or passive) could be used at the inlet end 412 of the sampling conduit 410 to steady out the flow of granular material through the sampling conduit 410.

A series of openings 420 can be provided along a bottom of the sampling conduit 410. Each opening 420 can lead to an associated sample collection cavity 430. As granular material passes through the sampling conduit 410 some of it falls through the openings 420 and into the associated sample cavities 430 where it will collect in the sample cavities 430 and eventually fill the sample cavities 430. When the sample cavities 430 are full of granular material, the sample cavities 430 can be filled right up to the their associated openings 420 connecting each sample collection cavity 430 with the sample conduit 410 and additional granular material entering the sample conduit 410 will simply flow through the sample conduit 410 to the outlet 414 because no more granular material can enter any of the sampling cavities 430 through the openings 420 because the sampling cavities 430 are already filled with granular material.

Each sample collection cavity 430 can be provided with a valve 440 in a bottom of the sample collection cavity 430. Periodically, each valve 440 can be opened and the sample cavities 430 emptied into corresponding sample containers 450. Each opening 420 and sample collection cavity 430 can be associated with a specific sample container 450.

In one aspect, the valves 440 can be manually controlled so that an operator must pull a lever, press a button or use an other type of actuator on the sample divider 400 to get the valves 440 to open and the sample cavities 430 to empty into their respective sample containers 450. However, in one aspect, the valves 440 could be electrically controlled, such as by relays, electric motor or pneumatic cylinder, etc., so that they can be opened in response to an electrical signal. In this manner, the sampling processor module 300 can control the operation and the timing of the valves 400. The valves 400 could be butterfly valve that rotates in the bottom of the sample collection cavity 430, rotate the entire sample collection cavity 430 upside down to empty, be a gate valve that slides away to open the bottom of the sample cavity, etc.

Typically, each sample container 450 has a much greater volume than its associated sample collection cavity 430 so it will require the sample collection cavity 430 to be filled and emptied into the sample container 450 a number of times before the sample container 450 is filled with granular material.

Figure 6:
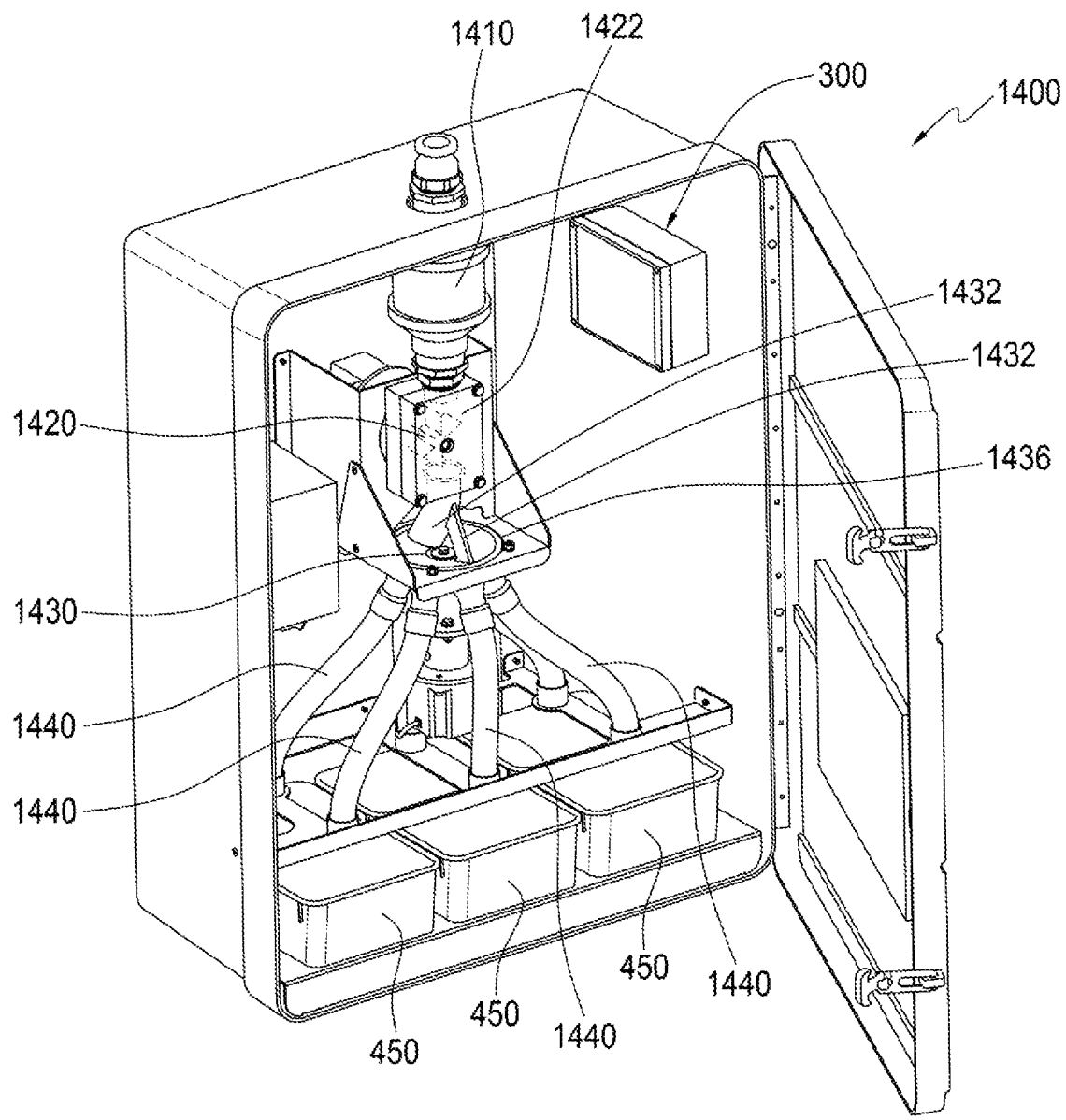
FIG. 6 is a schematic illustration of an alternative sample divider.

The sample divider 400 could take other forms. FIG. 6 illustrates an alternative sample divider 1400. Sample divider 1400 can have a collection chamber 1410; a metering wheel 1420; a diverter 1430; and a plurality of container conduits 1440 directing granular material to a plurality of sample containers 450.

Granular material routed to the sample divider 1400 by the sample transfer conduit 110 can direct the granular material into the collection chamber 1410 where the granular material will collect. Once the collection chamber 1410 is full or contains a desired amount of granular material, the metering wheel 1420 can be started rotating and the granular material in the collection chamber 1410 emptied into the rotating metering wheel 1420. The metering wheel 1420 can include a plurality or rotating compartments 1422 that smooth out the flow of the granular material.

From the metering wheel 1420, the granular material can be moved to the diverter 1430 to be divided into the different samples. The diverter 1430 can have conduits 1432 leading to a rotating disk 1436. The conduits 1432 can route the granular material to an outlet from the metering wheel 1420 to apertures in the rotating disk 1436 that mate with the openings in the plurality of container conduits 1440. As the rotating disk 1436 rotates, the apertures correspond with the different openings and direct the granular material into each of the plurality of container conduits 1440.

Each container conduit 1440 will then direct granular material that has entered into it, into one specific sample container.

In one aspect, a moisture sensor and a temperature sensor can be provided in the collection container 1410 to obtain moisture readings and temperatures readings when the granular material is collected in the collection container 1410 and before it is passed to the metering wheel 1420.

When the sample divider 1400 is finished its operation, a substantially identical portion of the sample portion will be distributed substantially equally in each of the sample containers 450.

Each sample container 450 will contain a substantially identical sample of granular material taken from the granular material moving through the material conveyor 10. For example, the sample divider 400 shown in FIG. 4 uses six (6) sample containers 450 so that the sample obtained from the sampling system 100 is six (6) substantially similar samples of granular material each stored in its own sample container 450 so that each sample container 450 should contain a sample of granular material taken and substantially the same portions of the load and having substantially similar qualities.

In one aspect, each sample container 450 can have a sealable lid 452 that can be closed and sealed to seal the granular material that has been obtained in the sample container 450. This can allow the moisture level of the granular material that is passing through the material conveyor to be maintained by the granular material in the sample container 450 because the sealable lid 452 can prevent moisture from escaping and the sample of granular material in the sample container 450 from drying out. Alternatively, the sample container 450 can include a valve that will allow moisture to be released from the sample container 450 to prevent the grain or other granular material in the sample container 450 from spoiling or rotting.

In one aspect, an electronic display, such as an e-ink based display, can be incorporated into the sample container 450. This electronic display can not only display a unique identifier, such as a barcode, associated with the particular sample container 450, but it can also display any other desired information. Alternatively, a paper label can be affixed to the sample container 450.

In a further aspect, the sample container 450 can include a sensor to detect each time the sealable lid 452 of the sample container 450 has been opened. If the sample container 450 also contains an electronic display, the number of times, and even the time, the sealable lid 452 of the sample container 450 was opened cam be displayed on the electronic display.

Figure 7:
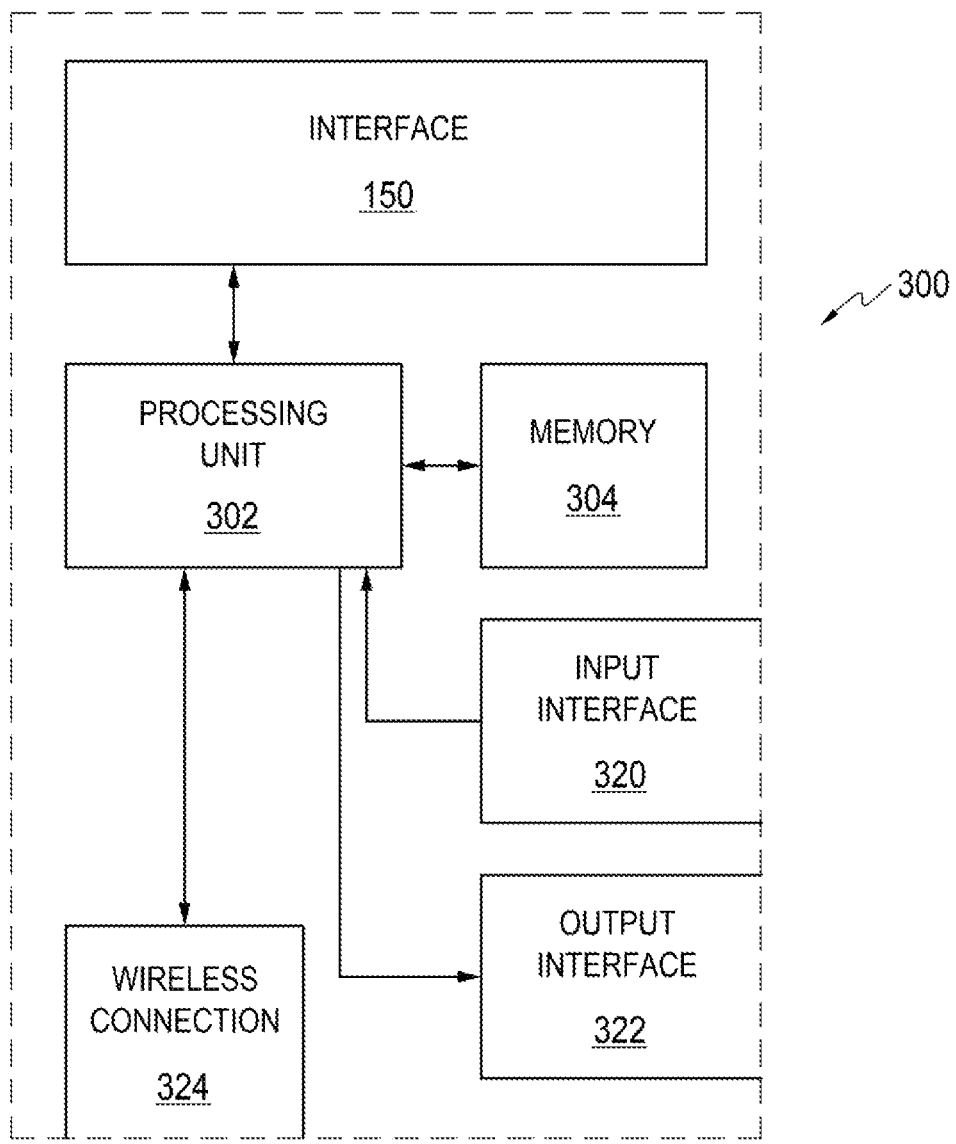
FIG. 7 is a schematic illustration of a sampling processor module of the sampling system.

The sampling processor module 300 can be used to control the operation of the sampling system 100. FIG. 7 illustrates the sampling processor module 300 in one implementation. The sampling processor module 300 can be include a processing unit 302, such a microprocessor that is operatively connected to a computer readable memory 304 and can control the operation of the sampling processor module 300. Program instructions for controlling the operation of the processing unit 302 can be stored in the memory 304 as well as any additional data needed for the operation of the sampling processor module 300.

An input interface 320 can be provided operatively connected to the processing unit 302 so that the sampling processor module 300 can receive signals from external sensors. In this manner, the sampling processor module 300 can be connected to the flow sensor 292 in the sample extractor 200 to detect the flow of granular material passing through the material conveyor 10 or even a flow rate meter detecting and measuring a flow rate of granular material passing through the material conveyor 10. Additionally, the input interface 320 can allow the connection of a flow sensor, moisture sensor and a temperature sensor to the sampling processor module 300 so that the sampling processor module 300 can obtain flow readings, moisture readings and temperature readings from these sensors.

Alternatively or additionally, the input interface 320 can be operatively connected to the moisture sensor and the temperature sensor in the collection chamber 1410 of the sample divider 1400.

An output interface 322 can be provided operatively connected to the processing unit 302 to send signals to other devices in the sampling system 100. For example, the valves 440 in the sample divider 400 can be connected to the output interface 322 so that they can be opened and shut based on commands from the sampling processor module 300. The output interface 322 can also be connected to a relay that controls the flow of electricity to the motor 270 in the sample extractor 200 so that the sampling processor module 330 can selectively supply the motor 270 with electricity thereby controlling the operation of the sample extractor 200 and when samples are obtained from the sample extractor 200 and routed to the sample transfer conduit 110 to be directed to the sample divider 400 or the sample divider 1400.

An interface 150 can be provided operatively connected to the sampling processor module 300 to allow a user to enter inputs into the sampling processor module 300 and control it. In one aspect, the sampling processor module 300 can include a wireless connection 324, such as a Bluetooth™ connection or an 802.11 connection, that can allows a device such as smart phone or tablet to be connected wirelessly to the sampling processor module 300 and act as the interface device 150. In one aspect, the interface device 150 could be a smart phone or tablet running an application (app), allowing an operator of the sampling system 100 to use his or her smart phone or tablet to enter inputs into the sampling processor module 300 and control the sampling processor module 300 using his or her smart phone or tablet as the interface device 150.

Alternatively, the interface device 150 could be physically part of the sample collection module 500 to allow a user to see the settings of the sampling processor module 300 and enter inputs and change parameters of the sampling processor module 300.

Figure 8:
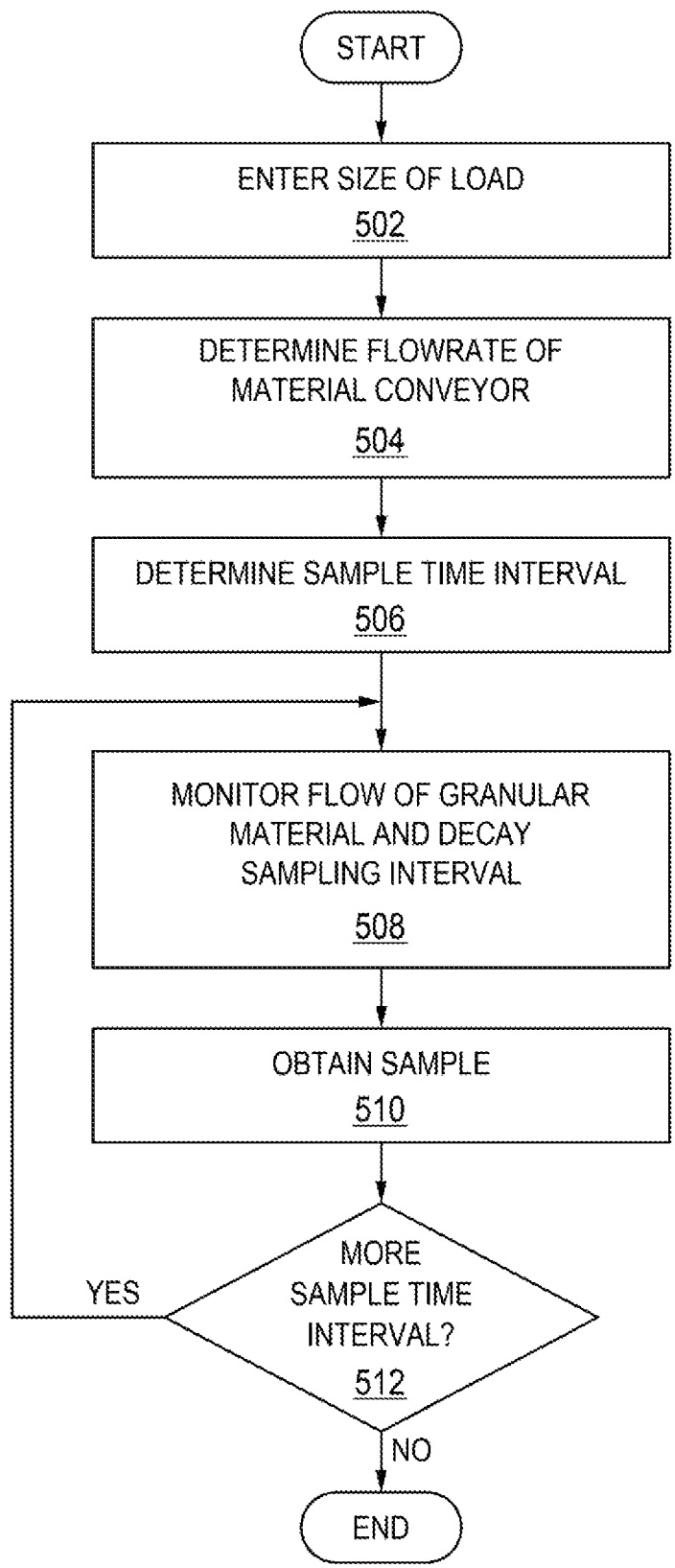
FIG. 8 is a flow chart of a method of taking a granular material sample over regular sampling time intervals.

The sampling system 100 could be used to obtain the plurality of samples in the sample containers 450 all at one time with the sample extractor 200 and the sample divider 400 or sample divider 1400 operating until the entire sample is taken at one time. However, in one aspect, the sampling system 100 can be set to have a desired sampling rate so that the samples obtained in the sampling containers 150 contain granular material from throughout the entire load being moved by the material conveyor 10 at regular intervals rather than simply taking the entire sample in each sampling container 150 at one single time or at random times while the load is moving through the material conveyor 10. FIG. 8 illustrates a flowchart of a method for obtaining a granular material sampler using the sampling system 100. In this method a sampling frequency based on an entire load of granular material being moved by the material conveyor 10 is determined so that the samples obtained in the sampling containers 450 not only are substantially similar to one another but also are taken at regular time intervals throughout the load to try and get an accurate representative sampling of the entire load. In one aspect, the steps of the method can be controlled by the sampling processor module 300.

The method can start and at step 502 the operator can enter the size of the load to be moved with the material conveyor 10 into the interface device 150 for the sampling processor module 300. This load could simply be the volume or other quantity of granular material in a truck or trailer that will be moved by the material conveyor 10 into a bin or other storage device. However, the load entered could also be the volume or quantity of a bin or other storage device to be filled with the granular material, ½ the size of the bin, etc. By entering the volume or quantity of granular material needed to fill up a particular bin as the load size and then using the material conveyor 10 to fill the bin, the sample taken with the sampling system 100 can be representative of the granular material in a bin instead of just the granular material in a specific truck or trailer load used to partially fill the bin. Even if more than one truck or trailer load of granular material must be used to fill the bin with granular material, the sample taken will be from these different truck or trailer loads and represent a sample of the granular material in the entire bin.

At step 504 the flow rate of the material conveyor 10 can be determined. The flow rate of the material conveyor 10 can just be a standard selection based on the size of the flighting or conveyor in the material conveyor 10, diameter of the conveying section 40, horsepower of the material conveyor 10, etc. that is used to calculate an approximate flow rate for a granular material conveyor 10. Alternatively, the flow rate of the material conveyor 10 can be determined by selecting the type and size of the material conveyor 10 (i.e. brand and model number) and then have it correlated to an average flowrate for that particular brand and model of material conveyor 10. For example, if an application is being run on the interface device 150, the operator can look up a table of brands of material conveyors 10 and the model numbers. Each brand and model number will be associated with a flow rate and when the operator selects the brand and model of the material conveyor 10 being used, the associate flow rate can be obtained and used for step 504.

In a further aspect, an operator may be able to further adjust the flow rate selected at step 504. If the operator is able to choose the flow rate based on the specific brand and model of the material conveyor 10 being used, the operator could be allowed to further adjust this predetermined flow rate. This can allow the operator to take into account situations where he or she has observed that the flow rate does not exactly meet the ideal flow rate assigned to his or her particular material conveyor 10, such as when the flighting in the material conveyor 10 has become worn and less effective, the angle of the material conveyor 10 is set higher than ideal, etc. In this manner, the operator can select the predefined flow rate and adjust it to match the particular material conveyor 10 being used.

At step 506 a sampling time interval can be determined for the moving of the entire load by the material conveyor 10. The flow rate determined at step 504 can be used along with the size of the load entered at step 502 to determine a length of time it will take to move the entire load of granular material through the material conveyor 10. This period of time can then be divided by the number of times each sample collection cavity 430 will be emptied into its associated storage container 450 if sample divider 400 is used or how many times the collector chamber 1410 will be emptied into the sample containers 450 if sample divider 1400 is used to determine the sampling time interval. The sampling time interval can represent a period of time between samples being taken by the sampling system 100 as the material conveyor 100 moves the load of granular material in order to result in the final sample containing granular material taken at regular time intervals as the granular material is moved by the material conveyor 10.

For example, if each sample in one of the sample containers 450 will eventually be consist of a sample where the associated sample collection cavity 430 or collection chamber 1410 has been filled up with granular material and emptied into the sample container 450 six (6) times (i.e. the sample in the sample container 450 will be made up of six (6) smaller samples taken by filling and emptying the sample collection cavity 430 six (6) times), the sample interval can be determined at step 506 by dividing the period of time it is estimated it will take the material conveyor 10 to move the entire load by six (6).

At step 508 the method can monitor the flow of granular material out of the material conveyor 10 and through the sample extractor 200 to determine when granular material is passing through the sample extractor 200. This can be done by the sampling processor module 300 obtaining signals from the flow sensor 292 in the sample extractor 200 to determine when granular material is being discharged from the material conveyor 10 and through the sample extractor 200. While it being determined that granular material is moving through the material conveyor 10 at step 508, the method can delay taking a sample for the period of time that is the sampling time interval. By only tracking the time being taken only while flow is being sensed in the material conveyor 10, the method can avoid the sampling time interval taking into account time when the material conveyor 10 is running but none of the granular material is actually passing through it to improve the regularity of the samples being taken. For example, the intake end 20 of the material conveyor 10 might be moved out of a pile of granular material temporarily causing the flow of granular material through the material conveyor 10 to stop. By only counting the sampling time interval when the flow of granular material is being sensed, this can help ensure the sample portions are being taken at more regular intervals through the entire load.

Additionally, if the operator has set the load at step 502 to be the quantity or volume of granular material to be loaded into a bin or other storage device in order to get a sample representing the total amount or granular material in the bin, and this load size will require a number of truck or trailer loads to be accomplished, only tracking the time in the sampling time interval when flow is being sensed passing through the sample extractor 200 will allow multiple incoming loads to be accomplished without greatly affecting the sampling. In the downtime between truck and trailer loads, the sampling processor module 300 will simply stop tracking time as part of the sampling time interval and then start again when the next truck or trailer load of granular material starts moving through the material conveyor 10.

As long as the flow sensor is determining that granular material is flowing through the material conveyor 10, the method can wait for the sampling time interval to pass before moving on to step 510 and obtaining a sample of the granular material. At step 510 after the sampling time interval has passed, the method can collect a sample portion of granular material. If the motor 270 of the sample extractor 200 is controlled by the sampling processor module 300, the sampling processor module 300 can cause the motor 270 to be supplied with power, which in turn will rotate the sampling member 250 in the sample extractor 200 through the discharging granular material passing through the sample extractor 200. The collected granular material can then be discharged through the first opening 280 and the second opening 281 as the sample member 250 rotates in front of the first opening 280 and the second opening 281. This extracted granular material will flow down the sample transfer conduit 110 and into the sample divider 400 or sample divider 1400. In the sample divider 400 it will pass through the sampling conduit 410 where it will begin to fall through the openings 420 in the sample conduit 410 and start collecting in the sample cavities 430. Eventually, when enough time has passed that the sample cavities 430 are full, the sampling processor module 300 can stop the motor 270, which will in turn stop the sample extractor 200 from collecting granular material from the discharging granular material and passing it down the sample transfer conduit 110 to the sample divider 400. The valves 440 can then be opened to empty the filled sampling cavities 430 into their corresponding sampling containers 450.

Alternatively, the valves 440 in the bottom of each sample collection cavity 430 can be opened to empty the sampling cavities 430 into their corresponding sample containers 450 so that granular material flowing through the sampling conduit 410 after it has been removed from the discharging flow of granular material by the sample extractor 200 and routed through the sample transfer conduit 410 to the sample divider 400 can once again start falling through the openings 420 in the bottom of the sampling conduit 410 and into the sampling cavities 430.

If the sample divider 1400 is used, the motor 270 can be run until the collection chamber 1410 has been filled and is ready to be discharged into the sample containers 450 and then the motor 270 stopped so the sample member 250 is positioned under the deflector 290.

With the sample obtained at step 510, the method can move onto step 512 and determine whether there are more sample portions of the granular material to obtain a complete set of samples in the sample containers 450. Typically, the number of sample time intervals and therefore the sample portions to be taken to fill each of the sample containers 450 will be the number of sample cavities 430 or the collection chamber 1410 desired to complete the sample in the much larger sample containers 450. For example, if this number is six (6) than the number of times the sample cavities 430 or collection chamber 1410 will be filled up and then emptied into the sample containers 450 will be six (6).

At step 512, it is determined that there are more sample portions to take, the method can return to step 508 and wait for the sample time interval while flow of granular material is being sensed passing through the sample extractor 200. After the sample time interval, the method can move on to step 510 and the next sample portion can be obtained and emptied into the sample container 450 before the method moves on to step 512 again and determines if there are more sample portions to take.

In this manner, the method will repeat steps 508, 510 and 512 until all the sample portions have been taken and the sample containers 450 contain complete samples.

In a further aspect, a flow rate sensor rather than just a flow sensor, can be used with the sampling system 100. Rather than approximating a flow rate of the material conveyor 10 and using it to determine when a sample time interval has passed, like is done in the method shown in FIG. 8, by using a flow rate sensor to monitor the actual flow rate of the granular material of the load being moved as it is transported through the material conveyor 10, a more accurate approximation of the amount of the load that has passed through the material conveyor 10 at any given time can be determined.

Figure 9:
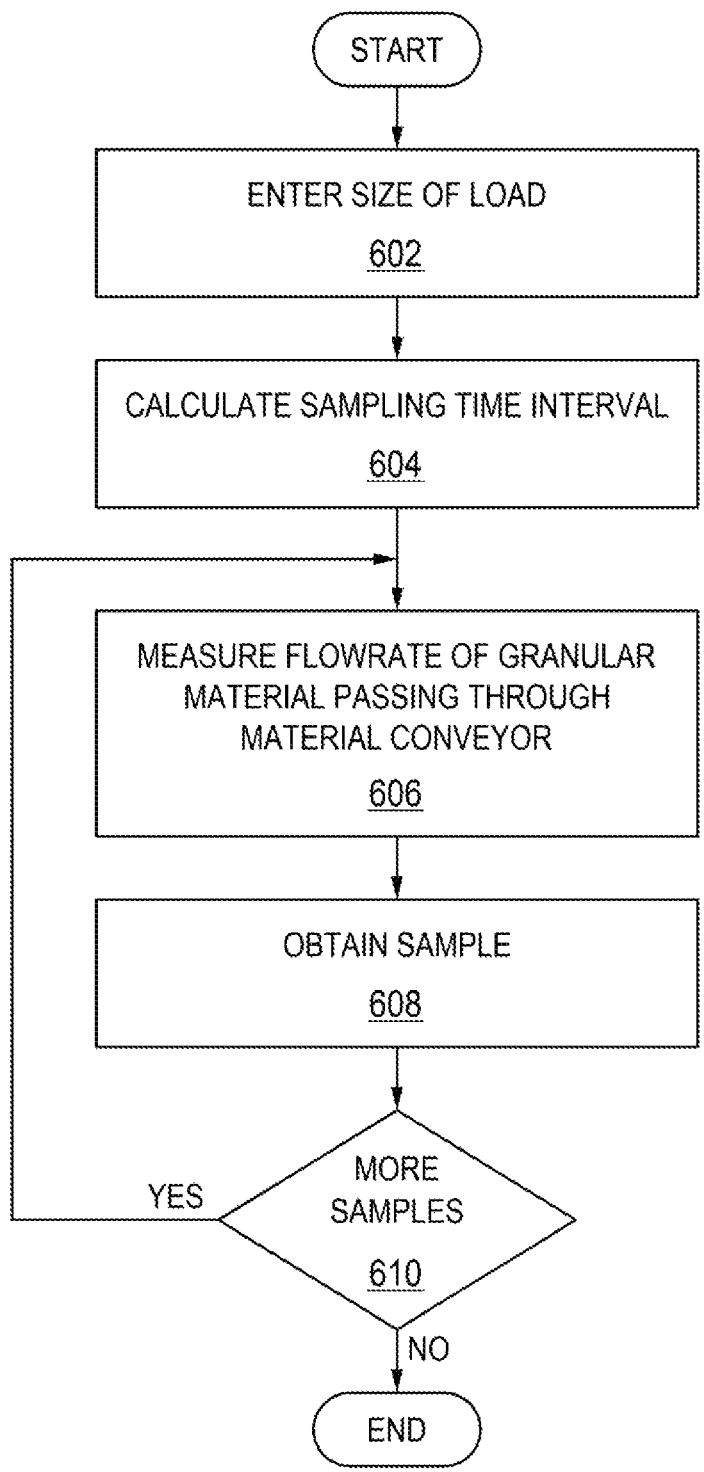
FIG. 9 is a flow chart of a method of taking a granular material sample and using a flow rate sensor to determine sampling time intervals.

FIG. 9 illustrates a method of sampling from a load of granular material passing through the material conveyor 10 where a flow rate sensor is used to determine how much of the granular material from a load has passed through the material conveyor 10 to determine when a sampling time interval has passed. The method can start and at step 602 the operator can enter the size of the load to be moved with the material conveyor 10 into the interface device 150.

At step 604 a sampling time interval can be determined for the moving of the entire load by the material conveyor 10. The size of the load entered at 502 can be taken and divided by the number of times the sampling cavities 430 are to be emptied into each of the sampling container 450 to determine the sampling time interval or the collection chamber 1410 is emptied into each sampling container 450. For example, if 10,000 ft$^3$ is the size of the load, there might be six (6) different samples taken or 1,667 ft$^3$ of granular material that has to move through the material conveyor 10 between each sample being taken and emptied into the sample container 450.

At step 606 the material conveyor 10 can be run and the flow rate of the granular material repeatedly measured with the flow rate sensor to calculate the amount of granular material that has flowed through the sample extractor 200. By determining the flow rate of the granular material in real or near-real time as the material conveyor 10 is in operation, it can be determined how much granular material has flowed through the material conveyor 10. By measuring the flow rate repeatedly, inconsistent flows of granular material can be taken into account. For example, if the material conveyor 10 starts having an inconsistent flow of granular material for any number of reasons (e.g. the load of granular material is being fed into the material conveyor inconsistently, the motor of the material conveyor 10 slows down, etc.), the flow rate sensor can measure this change in the flow rate of the granular material passing through the material conveyor 10 and compensate to make sure the sampling time interval is taken at the proper time.

At step 608, when it has been determined that a sampling time interval has passed through the material conveyor 10 (i.e. the amount or volume of granular material making up the sampling time interval), a sample portion of the granular material can be taken. Again, power can be supplied to the motor 270 of the sample extractor 200 to cause the sample member 250 to rotate in the sample extractor 200 and therefore cause the sample extractor 200 to obtain a sample of the granular material discharged from the discharge end 20 of the material conveyor 10.

Alternatively, the valves 440 in the sample divider 400 can be opened to dump the contents of the sampling cavities 430 into the associated sampling containers 450.

Once the sample of granular material has been obtained at step 608, the method can move on to step 610 and determine if there are any more sample portions to be taken in order to fill the sample containers 450. Again, if the sample divider 400 is designed so that each sample collection cavity 430 or the collection chamber 1410 of the sample divider 1400 is ⅙ the size of one of the final desired sample to be collected in each sample container 450, the number of samples to be taken over the load size is six (6). If at step 610 it is determined that more sample portions are to be taken, the method can return to step 606 and once again measure the amount of granular material flowing through the material conveyor 10 at step 606, obtain another sample portion at step 608 when the sample time interval has passed, and then check to see if any more sample portions are to be taken at step 610. In this manner, steps 606, 608 and 610 can be repeated until the desired number of sample portions have been taken and emptied into the sample containers 450 and the method will then end.

In one aspect, the moisture sensor 294 can be used to obtain moisture readings of the granular material as it passes through the sample extractor 200 or the sample divider 400 and the temperature sensor 296 can be used to measure the temperature of the granular material. The moisture and temperature readings could also be taken of the granular material in the collection chamber 1410 in the sample divider 1400. These moisture and temperature readings can either be displayed in real time on the interface device 150 or they can be taken at the sample time intervals to record the moisture content and temperature of the granular material passing through the sample extractor 200 or sample splitter 400 when the samples are taken. Alternatively, moisture readings and temperature readings can be taken by the moisture sensor 294 at different time during the moving of the granular material by the material conveyor 10 to determine an approximate average moisture content for the entire load of granular material.

In one aspect, by periodically taking moisture readings using the moisture sensor 294 and temperature readings using the temperature sensor 296, the moisture content and temperature of the granular material can be tracked and correlated with the location of the granular material in a bin it has been loaded into.

In one aspect, the sample system 100 can also be used to approximate the amount of granular material in a bin. If the material conveyor 10 is being used to fill a bin, the sample module processor 300 can use either an approximate flow rate, similar to the flow rate that is used in the method shown in FIG. 8 or a flow rate measured by a sensor in real time, similar to the flow rate determined for the method shown in FIG. 9. By multiplying the flow rate by the amount of time the sample module processor 300 is obtaining a signal that granular material is discharging out the material conveyor 10 and through the sample extractor 200, the amount of granular material that has been loaded into the bin by the material conveyor 10 can be approximated. This can allow an operator to approximate how much granular material has been loaded into a specific bin.

As the sample system 100 collects granular material, it can also obtain and store information specific to a sample obtained in the sample containers 450 so that each substantially identical sample stored in one of the storage containers 450 in the set of storage containers 450 can be linked with the stored information. This information can both be gathered by the sample module processor 300 during the collecting of the samples by the sample system 100 and/or entered by an operator, such as through the interface device 150, and this information then stored in a database. This information can then be associated with the samples obtained in the set of sample containers 450 so that a person with one of the sample containers 450 can access this information and look at the information that has been associated with the sample that has been collected in any one of the sample containers 450.

By storing this information in a remote database accessible over the internet or some other network, the crop producer, grain analysis lab, grain buyer, etc can all be given access to information or even different degrees of access to this stored information about a granular sample.

Figure 10:
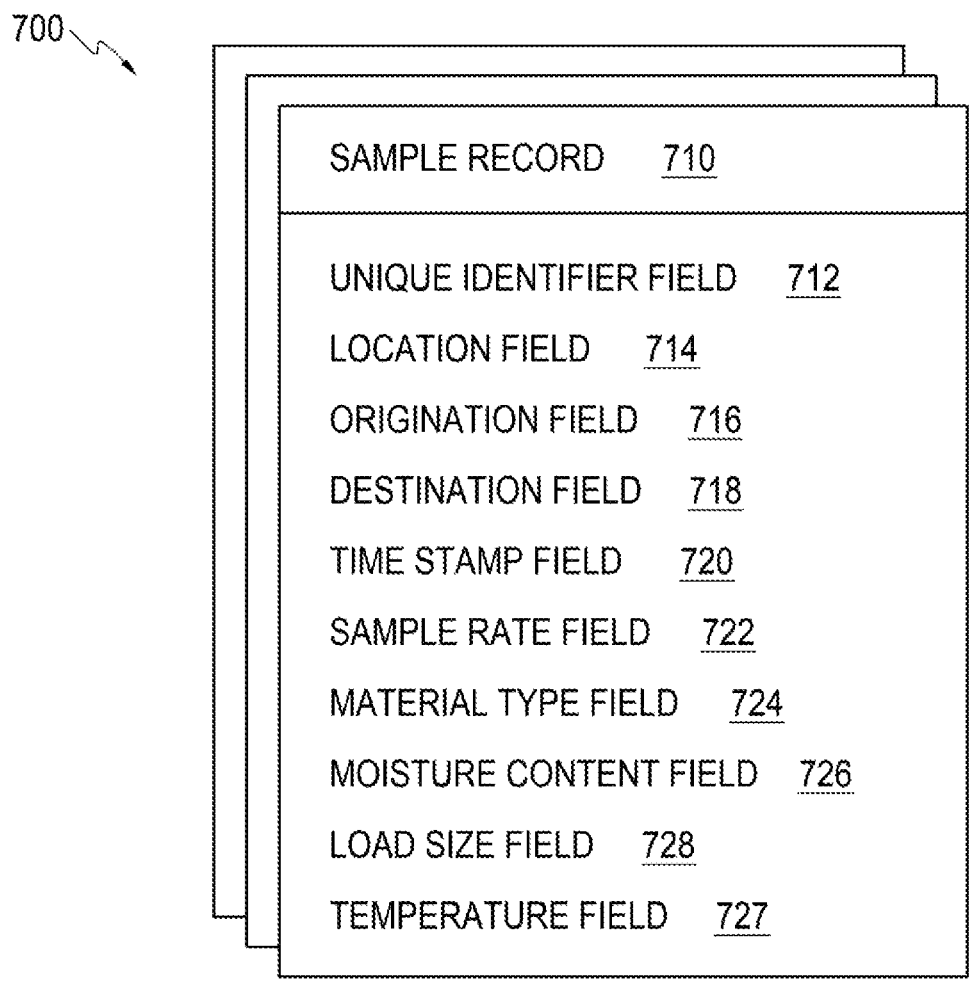
FIG. 10 is a data structure diagram one embodiment of a data structure used to store information about a set of sample.

FIG. 10 illustrates one implementation of a data structure that can be used to store information about the samples obtained using the sample system 100. The data structure 700 can contain a plurality of sample records 710 where each sample record corresponds to a set of samples obtained in a set of sample containers 450 by the sampling system 300 of a single load of granular material, such as grain or other crop material.

Each sample record 700 can contain: a unique identifier field 712; a location field 714; an origination field 716; a destination field 718; a time stamp field 720; sample rate field 722; a material type field 724; a moisture content field 726; a temperature field 727 and a load size field 728.

The unique identifier field 712 can contain an array of unique identifiers where each unique identifier in the array is associated with one of the individual sample containers 450 in a set of sample containers 450 making up a sample of one particular load of granular material. Each unique identifier can be a number, word or alphanumeric string shown on one of the sample containers 450 or it could be a bar code such as a linear bar code or 2D (matrix) barcode provided on the sample container 450 and read by a scanner or with a smart phone running the proper software. In a further aspect, the unique identifier could be stored in a RFID tag affixed to each sample container 450. The unique identifiers in the unique identifier field 712 can be used to locate the sample record 710 associated with a particular sample in the sample container 450 and thereby allow a person to access to the other information about the sample that is stored in the sample record 710.

Each sample record 710 can also optionally contain a location field 714. The location field 714 can be used to store information regarding the location of where the granular material in the sample was obtained. These could simply be a name of the farm or description of the field entered by the operator or farmer that moved the load with the material conveyor 10 and collected the sample with the sampling system 100. Alternatively, it could be a set of GPS coordinates taken of where the sample was taken, such as by the remote interface device 150, if it is a smart phone or other device capable of takin GPS coordinates of a location.

An origination field 716 can also be provided that allows at description of where the load originated, i.e was the load removed from a truck, grain bin, etc. and a destination filed 718 containing information about where the load was moved to, i.e. grain bin 4, truck, etc. In one aspect, this could be done by the user opening a drop down menu and selecting the appropriate option. This information can also be obtained in one aspect by providing a bar code on the bin, truck, etc. that can be scanned by the remote interface device 150 to identify where the load originated from or was loaded to.

The time stamp field 720 can be used to store a time stamp of when the load was transferred using the sampling system 100. This time stamp field 720 could simply contain a time when the material conveyor 10 started or stopped moving the load of granular material or it could contain both the start time and stop time. In a further aspect, the different times each sample was taken after a sampling time interval could be stored in the time stamp field 720 in an array so that it can be determined with the information not only when the material conveyor 10 started moving the load granular material and when the material conveyor 10 stopped, but also at what times granular material was sampled from the load and added to the sampling container 450.

The sample rate field 722 can be provided to store information about the sampling rate of the load. This could be the sampling time intervals determined when granular material from the load was extracted and added to the sampling containers 450.

The material type field 724 can be used to store information about the type of granular material that is being sampled, i.e. wheat, canola, etc.

The moisture content field 726 can contain information about the moisture content of the samples based on readings of the moisture content taken by the moisture sensor 294.

The temperature field 727 can include information indicating the temperature of the samples based on the temperature readings taken by the temperature sensor 296.

The load size field 728 can contain information approximating the size of the load of granular material that was loaded by the material conveyor 10 where the samples were obtained.

Figure 11:
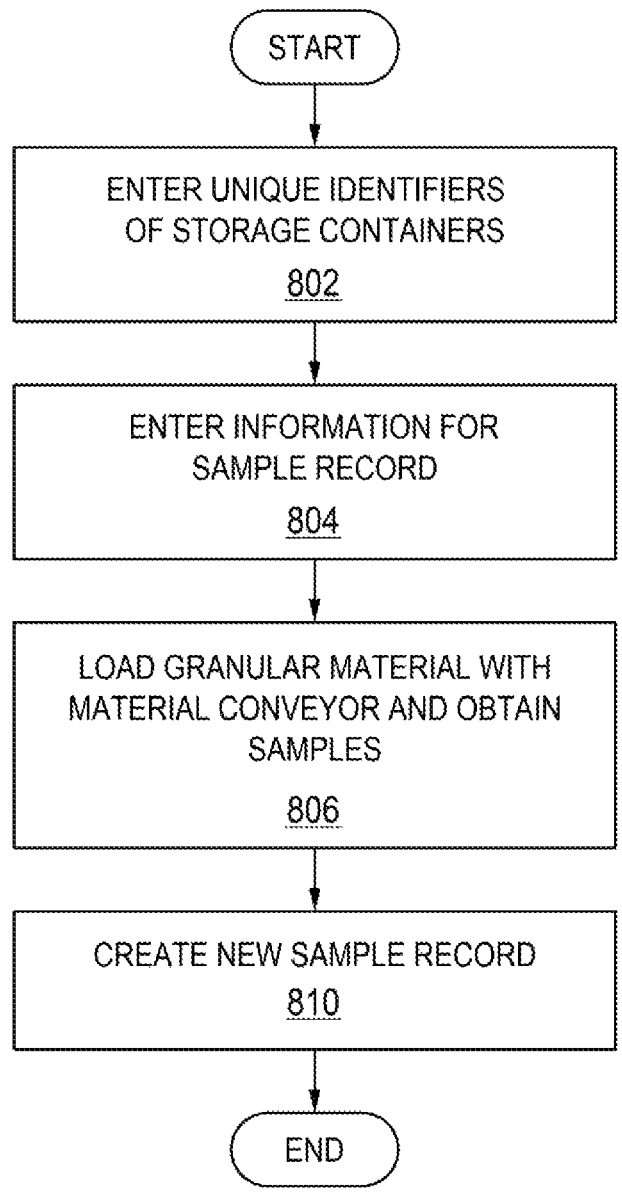
FIG. 11 is a flowchart of a method for collecting the information that can be stored in each sample record.

FIG. 11 illustrates a flowchart of a method for collecting the information that can be stored in each sample record 710. The method can start and at step 802 the operator of the sampling system 100 can enter the unique identifiers on each of the sampling containers 450 that will be used to store the sample. These unique identifiers can be entered either by the operator entering them into the interface device 150 or the sampling processor module 300. This can be done by the operator typing in each number, word or alphanumeric string into the interface device 150 for each of the sampling containers 450. Alternatively, if the interface device 150 is a smart phone or tablet, the remote interface device 150 can be used to take a photograph of a bar code on each of the sampling containers 450 and the remote interface device 150 can translate the bar code into a number, word or alphanumeric string. If the unique identifier is on a RFID tag, the unique identifier can be read when each storage container 450 is inserted in to the sample divider 400 or sample divider 1400. These unique identifiers can be used to later populate the unique identifier field 712 in the new sample record 710.

In one aspect, each unique identifier on the storage containers 450 must have been pre-entered into the system. In this manner, rather than saving any unique identifier provided on a sampling container 450, the system will only save unique identifiers that have already been pre-entered into the system. This will prevent operators from using other sample containers 450 and ensure only sample containers 450 issued by the controller of the system can be used in the sampling system 100.

After step 802 and the unique identifiers have been entered, the method can then move onto step 804 and the operator can enter the rest of the information into the sampling processor module 300. This information could include various information that will eventually be added to the new sample record 710 including the location of the granular material being sampled to be used in the location field 714 of the sample record 710, where the granular material originated from for the origination field 716, where the granular material was moved to for the destination filed 718, the type of material for the material type field 724, etc.

At step 806 the method can wait for the load to be moved by the material conveyor 10 while collecting any information necessary to populate the sample record 720. This could be the sample intervals for the sample rate field 722, the times the samples were taken for the material type field 724, etc.

After the load of granular material has been moved by the material conveyor 10 the sampling processor module 300 or the interface device 150 can collect any final information about the load that has been moved and move onto step 810. At step 810 the information gathered by the sampling processor module 300 and the interface device 150 during the method can be gathered and used to create the new sample record 710 associated with the specific sample. This sample record 710 can either be stored in the sampling processor module 300 or in one embodiment could be uploaded to a remote server to be stored in a database on the remote server. This would allow the sample records 700 to be stored in a remote server (or the "cloud") and make the information accessible by anyone with a device capable of accessing the remote server (or the "cloud").

In one aspect, sampling processor module 300 could wirelessly connect to a smart phone or other device capable of transmitting data and wirelessly transmit the sample record 710 to smart phone or other device for uploading to the remote server. In this manner, only the operator's smart phone would need to be able to connect to the interne or other remote server which would allow the method to work anywhere the smart phone could obtain a signal, rather than requiring the sampling processor module 300 to have the capability of transmitting the information to the remote server for storage of the sample record 710.

If the interface device 150 is a device wireless connected to the sampling processor module 300 such as an operator's smart phone or tablet, the method can be performed without the interface device 150 being connected to the sampling processor module 300 at all times. The operator could wirelessly connect the interface device 150 to the sampling processor module 300 to start the method and enter the information needed initially. For example, steps 802 and 804 of the method can be performed when the interface device 150 is connected to the sampling processor module 300. The sampling processor module 300 can then control the obtaining of the samples while the material conveyor 10 is moving the granular material and collect any needed information regardless of whether or not the interface device 150 is wirelessly connected to the sampling processor module 300. Step 806 could then be performed by the sampling processor module 300 regardless of whether or not the interface device 150 is still connected. For example, step 806 could be performed regardless of whether the interface device 150 is connected to the sampling processor module 300. Then, when the interface device 150 is eventually reconnected with the sampling processor module 300, step 810 can be performed and the new sample record 710 created and uploaded to the remote server by the interface device 150. This can allow the operator to leave the sampling system 100 running without having to ensure his or her smart phone remains connected to it all times.

Alternatively, the sampling processor module 300 could have a wireless connection 324 allowing the sampling processor module 300 to connect directly to the internet or a wireless lan available where the sampling system 100 is being used.

With step 810 finished and the new sample record 710 created (and uploaded to a remote server if desired), the method can end. At this point, especially if the sample record 710 is uploaded to a remote server, a person with access to any one of the sample container 450 in the set of sample containers 450 containing substantially identical samples of granular material, can use the unique identifier on the sample container 450 to access the information stored in the sample record 710 about the sample.

With the sample record 710 stored on a remote server it can be accessed by a number of different parties in a number of different ways. For example, an operator can open an application his or her smart phone, tablet or other mobile device and select view sample information. In some cases the operator would need to be authorized to access the information. The operator would then obtain the unique identifier from a sample container 450 and this unique identifier can then be used to access the information relating to that specific sample container 450. Alternatively, users can be provided with accounts on a webpage accessible using a web browser. The user would then access the user account on the internet and select view sample information. After entering the unique identifier of a specific sample container 450, the information related to the samples taken and obtained in the sample container 450 can be displayed.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A material sampling system for obtaining a plurality of substantially similar samples of granular material from a load of granular material, the system comprising:
   a sample extractor for obtaining a sample portion of granular material;
   a sample divider operative to divide the sample portion of granular material into a plurality of smaller samples of granular material in a plurality of sample containers;
   a sample transfer conduit for transferring the sample of granular material from the sample extractor to the sample divider; and
   a sampling processor module operative to control the operation of the sample extractor and the sample divider, the sampling processor module comprising: at least one processing unit; and a computer readable memory containing program instructions operative to control an operation of the sampling processor module, wherein the programming instructions are operative to:
      receive input indicating a size of load;
      determine a flowrate of granular material through the sample extractor;
      determine a sample time interval;
      while flow is being sensed passing through the sample extractor, wait for the sample time interval to pass and then obtain a sample portion; and
      continue to take sample portions after each sample time interval has passed while flow of granular material passing through the sample extractor is being sensed until all of the sample portions have been taken,
   wherein the sample time interval is determined by using the size of the load, the determined flowrate of granular material and a number of sample portions to be taken.

2. The material sampling system of claim 1 wherein the sample extractor comprises:
   an open top;
   an open bottom;
   body having a passage running therethrough;
   a sampling member connected to a shaft provided in the passage, a first end of the sampling member connected to the shaft and the sampling member extending from the first end to a second end; and
   at least one opening in the cylindrical body in a path of the rotating second end of the sampling member, wherein the at least one opening is operatively connected to the sample transfer conduit.

3. The material sampling system of claim 2 wherein the second end of the sampling member is positioned approximate an inner wall of the cylindrical body.

4. The material sampling system of claim 2 wherein the sampling member has a u-shaped cross-section forming a channel.

5. The material sampling system of claim 2 wherein the sample extractor further comprises a motor to rotate the shaft and cause the sample member to rotate through a cross, section of the passage.

6. The material sampling system of claim 2 wherein there are two sampling members that rotate past a first opening and a second opening in the wall of the cylindrical body.

7. The material sampling system of claim 6 wherein the first opening and the second opening are positioned approximately 180° from each other.

8. The material sampling system of claim 6 wherein the sample member slopes downward from the first end of the sample member to the second end of the sample member.

9. The material sampling system of claim 6 wherein a first conduit is connected between the first opening and the sample transfer conduit and a second conduit is connected between the second opening and the sample transfer conduit.

10. The material sampling system of claim 2 wherein the sample extractor further comprises a position sensor to indicate when the sample member is in a predetermined position.

11. The material sampling system of claim 10 wherein a deflector is provided in the passage positioned over the predetermined position of the sample member.

12. The material sampling system of claim 10 wherein a first opening and a second opening are positioned under the deflector.

13. The material sampling system of claim 1 wherein the sample divider comprises:
   a collection container downstream from the sample transfer conduit for collection granular material;
   a diverter operatively connected to the collection container; and,
   a plurality of container conduits provided downstream of the diverter and each container conduit leading to a single sample container.

14. The material sampling system, of claim 13 wherein the sample divider further comprises a metering wheel positioned between the collection container and the diverter.

15. The material sampling system of claim 1 wherein the sampling processor module further comprises: an input interface; and an output interface.

16. The material sampling system of claim 15 wherein the input interface is connected to a flow sensor of the sample extractor so that the sampling processor module receives signals from the flow sensor.

17. The material sampling system of claim 15 wherein the input interface is operatively connected to a temperature sensor and a moisture sensor.

18. The material sampling system of claim 15 wherein the output interface is operatively connected to a motor on the sample extractor to control when the motor is in operation and the at least one sample member is rotated in the sample extractor.

19. The material sampling system of claim 15 wherein the input interface is operatively connected to a position sensor on the sample extractor.

20. The material sampling system of claim 1 wherein the sampling processor module further comprises a wireless connection.

21. The material sampling system of claim 20 wherein the sampling processor module is at least one of: a Bluetooth connection; and an 802.11 connection.

22. The material sampling system of claim 1 wherein the sample divider splits the sample into more than two sample containers.

23. The material sampling system of claim 22 wherein the sample divider splits the sample into six sample containers.

24. The material sampling system of claim 1 wherein the programming instructions are operative to control the sample extractor and the sample divider to obtain samples of the granular material passing through the sample extractor at regular time intervals so each sample container contains granular material from throughout the load.

25. The sampling system of claim 1 wherein time for the sample time interval is not counted when flow is not being sensed passing through the sample extractor.

26. The sampling system of claim 1 wherein the sampling processor module further comprises an output interface operatively connected to a motor on the sample extractor, and wherein the sample portion is obtained by using the output interface to send a signal to the motor of on the sample extractor.

27. The sampling system of claim 1 wherein the program instructions are operative to:
   determine a flowrate of granular material through the sample extractor;
   determine an amount of time granular material passes through the sample extractor; and
   using the flowrate of granular material through the sample extractor and the amount of time granular material passes through the sample extractor to approximate an amount of granular material that has passed through the sample extractor.

28. The sampling system of claim 1 wherein the program instructions are operative to:
   receive input indicating unique identifiers on each of the plurality of sample containers;
   receive input indicating information about the plurality of samples of granular material;
   obtain sample portions of granular material passing through the sample extractor for the load of granular material and collect information about the sample portions;
   using the information about the plurality of samples of granular material and information collected when the sample portions are obtained to create and populate a sample record; and
   associating the sample record with the unique identifiers.

29. The sampling system of claim 28 wherein the input indicating unique identifiers on each of the sampling containers read, from an RED tag.

30. The sampling system of claim 28 wherein the input indicating information about the plurality of samples of granular material is entered into the sampling processor module through an interface device.

31. The sample system of claim 28 wherein the programs instructions are further operative to transmit the storage record to a remote server.

32. A system for obtaining a plurality of substantially similar samples of granular material, the system comprising:
   a material conveyor comprising:
   an intake end;
   a discharge end; and
   a conveying section connecting the intake end and the discharge end, and a material sampling system comprising:
      a sample extractor for obtaining a sample of granular material, the sample extractor positioned below the discharge end of the material conveyor;
      a sample divider operative to divide the sample of granular material into a plurality of smaller samples of granular material in a plurality of sample containers; and
   a sample transfer conduit for transferring the sample of granular material from the sample extractor to the sample divider; and
   a sampling processor nodule operative to control the operation of the sample extractor and the sample divider, the sampling processor module comprising: at least one processing unit; and a computer readable memory containing program instructions operative to control an operation of the sampling processor module, wherein the programming instructions are operative to:
      receive input indicating a size of load;
      determine a flowrate of granular material through the sample extractor;
      determine a sample time interval;

while flow is being sensed passing through the sample extractor, wait for the sample time interval to pass and then obtain a sample portion; and continue to take sample portions after each sample time interval has passed while flow of granular material passing through the sample extractor is being sensed until all of the sample portions have been taken, wherein the sample time interval is determined by using the size of the load, the determined flowrate of granular material and a number of sample portions to be taken.

33. The system of claim 32 wherein the conveying section is an auger.

\* \* \* \* \*

UNITED STATES PATENT AND TRADEMARK OFFICE
CERTIFICATE OF CORRECTION

PATENT NO. : 10,942,094 B2
APPLICATION NO. : 15/778556
DATED : March 9, 2021
INVENTOR(S) : Kenneth Ernest Russell Jackson et al.

It is certified that error appears in the above-identified patent and that said Letters Patent is hereby corrected as shown below:

In the Claims

Column 18 Claim 5, Line 53, delete "shaft and cause the sample member to rotate through a cross," and insert therefore -- shaft and cause the sample member to rotate through a cross --;

Column 19 Claim 26, Line 66, delete "output interface to send a signal to the motor of on the" and insert therefore -- output interface to send a signal to the motor on the --;

Column 19 Claim 29, Line 31, replace the word "RED" and insert therefore -- RFID --;

Column 19 Claim 32, Line 57, replace the word "nodule" and insert therefore -- module --.

Signed and Sealed this
Twenty-third Day of August, 2022

Katherine Kelly Vidal
*Director of the United States Patent and Trademark Office*